US011912820B2

(12) United States Patent
Kim

(10) Patent No.: US 11,912,820 B2
(45) Date of Patent: Feb. 27, 2024

(54) CYCLIC ETHER- AND HYDROXYL-CONTAINING COMPOSITIONS USEFUL FOR PRODUCING FAST DRY ALKYD POLYMERS AND METHODS FOR MAKING SUCH CYCLIC ETHER- AND HYDROXYL-CONTAINING COMPOSITIONS

(71) Applicant: Arkema Inc., King of Prussia, PA (US)

(72) Inventor: Kyu-Jun Kim, Cary, NC (US)

(73) Assignee: Arkema Inc., King of Prussia, PA (US)

( * ) Notice: Subject to any disclaimer, the term of this patent is extended or adjusted under 35 U.S.C. 154(b) by 277 days.

(21) Appl. No.: 17/278,430

(22) PCT Filed: Sep. 20, 2019

(86) PCT No.: PCT/US2019/052155
§ 371 (c)(1),
(2) Date: Mar. 22, 2021

(87) PCT Pub. No.: WO2020/068582
PCT Pub. Date: Apr. 2, 2020

(65) Prior Publication Data
US 2021/0363293 A1 Nov. 25, 2021

Related U.S. Application Data

(60) Provisional application No. 62/737,160, filed on Sep. 27, 2018.

(51) Int. Cl.
*C08G 63/52* (2006.01)
*C08G 63/83* (2006.01)
*C09D 167/08* (2006.01)
*C09D 11/105* (2014.01)
*C09J 167/08* (2006.01)
*C09K 3/10* (2006.01)

(52) U.S. Cl.
CPC ............. *C08G 63/52* (2013.01); *C08G 63/83* (2013.01); *C09D 11/105* (2013.01);
(Continued)

(58) Field of Classification Search
None
See application file for complete search history.

(56) References Cited

U.S. PATENT DOCUMENTS 3,487,034 A 12/1969 Mallios et al.
3,963,699 A 6/1976 Rizzi et al.
(Continued)

FOREIGN PATENT DOCUMENTS

CA 2176534 11/1996
CN 103102476 A 5/2013
(Continued)

OTHER PUBLICATIONS

K. Hájek in Farbe und Lack (vol. 83, No. 9, pp. 798-804, 1977).
(Continued)

*Primary Examiner* — Tae H Yoon
(74) *Attorney, Agent, or Firm* — Lynn B. Morreale

(57) ABSTRACT

An alkyd polymer composition for fast-drying, low VOC applications is provided. The alkyd polymer incorporates a minimum required level of a cyclic ether- and hydroxyl-containing composition formed from a sugar alcohol during the alcoholysis step while synthesizing the alkyd polymer. The disclosure also relates to the cyclic ether- and hydroxyl-containing composition which must have a minimum required level of cyclic ether structure incorporated therein in order to produce a sufficiently fast-drying alkyd polymer. Methods of making the cyclic ether- and hydroxyl-containing composition and the alkyd polymer comprising, as polymerized units, the cyclic ether- and hydroxyl-containing composition and a poly acid and/or an anhydride compound, as well as an optional polyol, other than the sugar alcohol, are also provided. Also provided is a 13 C NMR method of characterizing the necessary minimum required level of cyclic ether ring structure in the cyclic ether- and hydroxyl-
(Continued)

containing composition and the alkyd polymer formed therefrom.

15 Claims, 9 Drawing Sheets

(52) U.S. Cl.
CPC .......... *C09D 167/08* (2013.01); *C09J 167/08* (2013.01); *C09K 3/10* (2013.01); *C09K 2200/0655* (2013.01)

(56) References Cited

U.S. PATENT DOCUMENTS

| | | |
|---|---|---|
| 2010/0041821 A1 | 2/2010 | Eslinger et al. |
| 2012/0142819 A1* | 6/2012 | Dziczkowski ..... C09D 167/025 524/378 |

FOREIGN PATENT DOCUMENTS

| | | |
|---|---|---|
| WO | WO 92/00947 | 1/1992 |
| WO | WO9938926 A1 | 8/1999 |
| WO | WO 2007/074334 A2 | 7/2007 |
| WO | WO 2013/056162 A1 * | 4/2013 |
| WO | WO 2018/048638 A1 | 3/2018 |

OTHER PUBLICATIONS

D. Bagchi et al. in Journal of Coatings Technology (vol. 58, No. 740, pp. 51-56, 1986).

Yin et al. in Progress in Organic Coatings (vol. 77, pp. 674-678, 2014).

* cited by examiner

CYCLIC ETHER- AND HYDROXYL-CONTAINING COMPOSITIONS USEFUL FOR PRODUCING FAST DRY ALKYD POLYMERS AND METHODS FOR MAKING SUCH CYCLIC ETHER- AND HYDROXYL-CONTAINING COMPOSITIONS

CROSS-REFERENCE TO RELATED APPLICATIONS

This application is a national stage application under 35 U.S.C. § 371 of PCT/US2019//052155, filed Sep. 20, 2019, which claims benefit to U.S. application Ser. No. 62/737,160, filed Sep. 27, 2018

FIELD OF THE INVENTION

The present invention relates to alkyd polymers. In particular, the invention relates to cyclic ether- and hydroxyl-containing compositions that are useful for producing fast dry alkyd polymers. The invention further relates to methods for making such cyclic ether- and hydroxyl-containing compositions and methods of making the alkyd polymers incorporating the cyclic ether- and hydroxyl-containing compositions. The cyclic ether- and hydroxyl-containing compositions can be derived from sugar alcohols comprising at least 6 carbon atoms that are capable of forming at least one cyclic ether ring through an intramolecular cyclization reaction upon heating. Incorporating a minimum required amount of such cyclic ether ring structure into the alkyd polymer produces an alkyd polymer having a reduced drying time, and improved properties, including reduced viscosity without an accompanying reduction in physical properties.

BACKGROUND OF THE INVENTION

Alkyd polymer resins are typically formulated into coating products that incorporate a solvent to reduce their viscosity for the application and facilitate spreading the alkyd resin onto a substrate. Continuing environmental pressure from various authorities mandates that the coating industry adopt low Volatile Organic Compounds (VOC) alkyd products to minimize harmful volatiles entering the environment. In order to comply with ever-tightening VOC regulations, the coating industry may choose waterborne alkyds, high solids solvent-borne alkyd products, and high VOC alkyd products formulated with an exempt solvent.

Each of these technologies has advantages and disadvantages. Although waterborne alkyd formulations show some promise in their ability to replace many solvent borne coatings, high solids or exempt solvent approaches are still preferred for many applications where high levels of substrate cleanliness is required and the environment of the curing conditions are less than ideal. Exempt solvents often have formulation challenges such as cost, odor, and flash point. To date there is not an ideal universal exempt solvent, and therefore when using an exempt solvent in coatings, formulators try to minimize the use of these solvents by using alkyd resins with lower viscosity.

There are several generally accepted approaches to lowering the viscosity of alkyd polymers; lower the molecular weight, increase the fatty acid amount, build a highly branched polymer structure, or achieve a narrow polymer molecular weight distribution The decrease in the molecular weight and the increase in fatty acid may help lower the viscosity of alkyd polymer, but the lower viscosity is achieved at the expense of inferior coating performance. On the other hand, producing a highly branched polymer structure and/or producing a narrow molecular weight distribution polymer generally requires high cost raw materials and a long (i.e., expensive) production process. None of these approaches is suitable for developing commercially viable low VOC alkyd products due to either or both of a significant performance gap and prohibitively high raw material and processing costs.

Sorbitol is a polyol that can be used for the alcoholysis step in the formation of an alkyd resin. Sorbitol is also known to form a five-membered ring (sorbitan) and a bi-cyclic structure containing two five-membered rings (isosorbide) upon heating at high temperature above 200° C. This reaction is relatively slow, even at such high temperatures.

As will be disclosed herein, it was surprisingly found that incorporating a minimum required amount of this cyclic ether ring structure into the alkyd polymer produces an alkyd polymer having a reduced drying time and improved properties. Among the improved properties are a reduced viscosity, without an accompanying reduction in physical properties. Generally, inclusion of this minimum required amount of the cyclic ether ring structure into the alkyd polymer is achieved by performing the alcoholysis reaction for a period of time long enough to effect enough cyclic ether formation, prior to the inclusion of the poly acid and/or the anhydride compound into the reaction mixture.

Additionally, as will be disclosed herein, it was determined that in order for this minimum required amount of cyclic ether ring structure to be included in the alkyd polymer, not only must the poly acid and/or the anhydride compound be added to the reaction mixture after formation of the cyclic ether ring structure, but a minimum required level of the cyclic ether ring structure must be formed prior to the inclusion of the poly acid and/or the anhydride compound into the reaction mixture when the alkyd polymer is formed. As will be described in more detail herein, it is possible to introduce the cyclic ether ring structure into the alkyd polymer when sorbitol or another sugar alcohol capable of forming a cyclic ether ring structure is employed during the alcoholysis step of the production of the alkyd polymer. An additional benefit of using sorbitol or other sugar alcohol is the potential for low material cost as well as environment friendliness since such compounds are derivable from agriculture products.

Other workers have attempted to incorporate a sugar alcohol as a polyol into an alkyd polymer, but none have successfully included the minimum required level of the cyclic ether ring structure into the alkyd polymer that is necessary to effect the improvement in drying time and physical properties.

K. Hájek in *Farbe und Lack* (Vol. 83, no. 9, pages 798-804, 1977) describes a sorbitol- or xylitol-containing alkyd polymer produced by the alcoholysis reaction of oil and polyol (glycerine and pentaerythritol) followed by the condensation reaction with phthalic anhydride in the presence of sorbitol or xylitol. This process does not result in the production of the cyclic ether- and hydroxyl-containing composition as the precursor for the alkyd polymer because phthalic anhydride and sorbitol are added to the reaction mixture at the same time and after the completion of the alcoholysis step.

D. Bagchi et al. in *Journal of Coatings Technology* (Vol. 58, No. 740, pages 51-56, 1986) describes an alkyd polymer containing 7 to 12% sorbitol showing similar properties to glycerol or pentaerythritol modified alkyd resins. However, this disclosure does not disclose the production of the cyclic ether- and hydroxyl-containing composition as the precursor for the fast drying alkyd polymer.

Yin et al. in *Progress in Organic Coatings* (Vol. 77, pages 674-678, 2014) discloses a kinetic study on the synthesis of alkyd polymer based on soya fatty acid, sorbitol, and phthalic anhydride. The disclosure does not disclose the cyclic ether- and hydroxyl-containing composition containing an amount of cyclic ring structure which produces fast drying alkyds.

CA 2,175,534 A1 describes an alkyd emulsion produced with renewable raw materials comprising alkyd polymer and an emulsifier. One of the examples includes the alcoholysis of soybean oil, glycerine, and sorbitol at 250° C. for 3 hours. Although adequate for alcoholysis for the subsequent condensation reaction with succinic anhydride, the three hour heating at 250° C. is not sufficient to achieve the necessary minimum required amount of cyclic ether ring incorporation into the alkyd polymer to achieve fast dry.

SUMMARY OF THE INVENTION

Alkyd resins are polyesters made from the reaction of an alcohol and an acid. A typical process to synthesize an alkyd resin from an oil generally comprises a first step of "alcoholysis", wherein an oil (e.g., fatty acid triglyceride) or mixture of oils, which preferably comprises some unsaturation, is trans-esterified with a polyol, such as pentaerythritol, in the presence of a catalyst, to produce a mixture comprising a hydroxyl-functionalized fatty acid ester This hydroxyl-functionalized fatty acid ester is then reacted with a poly acid and/or an anhydride compound to synthesize the alkyd resin.

The present invention relates to a cyclic ether- and hydroxyl-containing composition, containing cyclic ether rings, useful to produce fast dry alkyd polymers, as well as the method for making such a composition. This cyclic ether- and hydroxyl-containing composition can be derived from a sugar alcohol. In general, the cyclic ether- and hydroxyl-containing composition comprises, in trans-esterified form: 20-90% by weight of a fatty acid ester (such as a fatty acid triglyceride, which may be supplied by a vegetable oil or modified vegetable oil), 5-80% by weight of a sugar alcohol having at least 6 carbon atoms, and 0 to 50% by weight of poly hydroxyl compound (polyol) other than the sugar alcohol. The sugar alcohol is capable of forming at least one cyclic ether ring, and preferably at least two cyclic ether rings, through intramolecular cyclization upon heating. The cyclic ether- and hydroxyl-containing composition also exhibits a plurality of peaks between 75-90 ppm on a $^{13}$C NMR spectrum that are associated with the cyclic ether rings. The NMR spectrum also exhibits peaks between 126 and 132 ppm that are the vinyl carbons associated with the unsaturated bonds in the fatty acid ester. The ratio of integration of the 75-90 ppm peaks to the integration of the 126-132 peaks must be higher than 0.25 in order for the resulting alkyd polymer to have the desired properties.

The present invention also relates to the alkyd polymers that incorporate this cyclic ether- and hydroxyl-containing composition. The alkyd polymer comprises, in polymerized form, 10-86 weight %, based on the total weight of the alkyd polymer, of a fatty acid ester (e.g., fatty acid triglyceride); 2-76 weight %, based on the total weight of the alkyd polymer, of a sugar alcohol having at least 6 carbon atoms and being capable of forming a cyclic ether ring through intermolecular condensation; 0 to 48 weight %, based on the total weight of the alkyd polymer, of the polyol other than the sugar alcohol; and 10-50 weight %, based on the total weight of the alkyd polymer, of a poly acid and/or an anhydride compound. This alkyd polymer exhibits a plurality of peaks between 75-90 ppm on a $^{13}$C NMR spectrum that are associated with the cyclic ether rings provided by the cyclic ether- and hydroxyl-containing composition. The NMR spectrum also exhibits peaks between 126 and 132 ppm that are associated with the unsaturated bonds in the fatty acid ester and any aromatic carbons of the poly acid and/or anhydride compound. The ratio of integration of the 75-90 ppm peaks to the integration of the 126-132 peaks must be higher than 0.10 in order for the resulting alkyd polymer to have the desired properties.

The invention also relates to methods of making such alkyd polymers. The method comprises two steps. The first step is alcoholysis of a mixture comprising 20-90 weight %, based on the total weight of the mixture, of at least one fatty acid ester; 5-80 weight %, based on the total weight of the mixture, of least one 6-carbon sugar alcohol that can form a cyclic ether ring through an intramolecular reaction; and 0 to 50% by weight of poly hydroxyl compound (polyol) other than the sugar alcohol; but no poly acid nor any anhydride compound This alcoholysis step produces a cyclic ether- and hydroxyl-containing composition that exhibits a plurality of peaks at 70-90 ppm on a $^{13}$C NMR spectrum. The alcoholysis step is performed at a temperature high enough and for a long enough time to produce at least 0.001 moles of cyclic ether derived from the sugar alcohol per gram of the cyclic ether- and hydroxyl-containing composition, such that the ratio of integration of the 75-90 ppm C$^{13}$ NMR peaks to the integration of the 126-132 C$^{13}$ NMR peaks is higher than 0.25. The moles of cyclic ether derived from the sugar alcohol produced per gram of the cyclic ether- and hydroxyl-containing composition can be conveniently calculated by measuring the grams of water produced during the alcoholysis step and dividing that by the molecular weight of water (18.02). This result is then divided by the total starting grams of the alcoholysis mixture minus the grams of produced water. The second step of producing the alkyd polymer is a condensation of the cyclic ether- and hydroxyl-containing composition from the first step with 5-200 weight %, based on the weight of the cyclic ether- and hydroxyl-containing composition, of a poly acid and/or an anhydride compound (i.e., a combination of poly acid and anhydride compound).

The alcoholysis step is performed in the absence of the poly acid or anhydride compound and takes place at a sufficiently high enough temperature and for a sufficient period of time to ensure that at least 0.001 moles of cyclic ether derived from the sugar alcohol are produced per gram of the cyclic ether- and hydroxyl-containing composition and the ratio of integration of the 75-90 ppm C$^{13}$ NMR peaks to the integration of the 126-132 C$^{13}$ NMR peaks is higher than 0.25 before the poly acid and/or the anhydride compound is added to the mixture.

Introducing a cyclic ether structure into the alkyd polymer as disclosed herein provides a rapidly drying alkyd based coating. However, the introduction of high levels of cyclic structure into the alkyd polymer has not been previously economically feasible for wide application.

The present invention provides an economical route to produce a cyclic ether intermediate from a sugar alcohol that produces a fast dry alkyd coating resin. In addition, the alkyd polymer is environmentally friendly because the sugar alcohol starting material is substantially derived from agriculture products.

Further areas of applicability will become apparent from the description provided herein. It should be understood that the description and specific examples are intended for pur-

DETAILED DESCRIPTION OF THE INVENTION

The following description is merely exemplary in nature and is in no way intended to limit the present invention or its application or uses.

Figure 1:
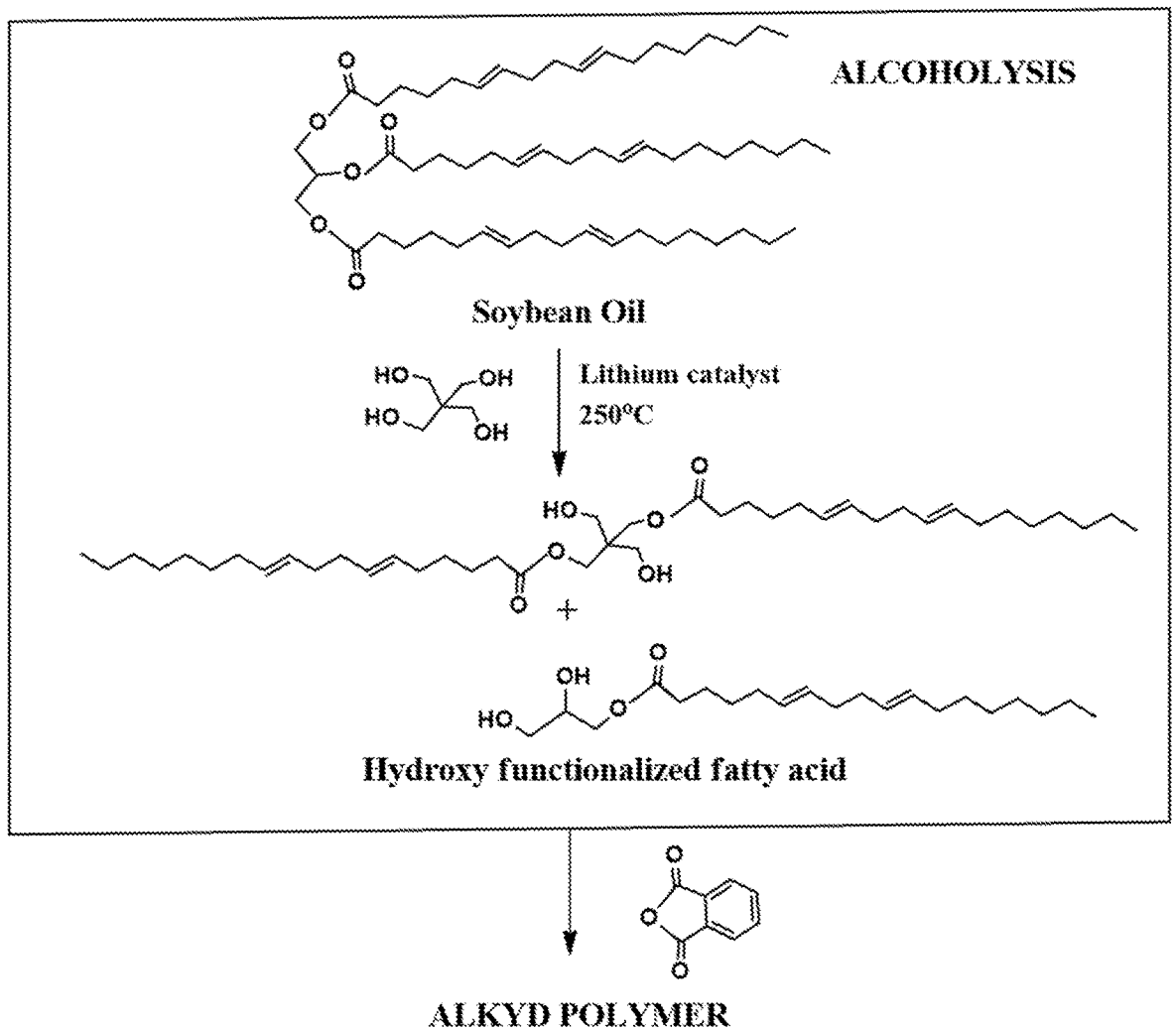
FIG. 1 shows a typical reaction scheme for making an alkyd polymer.

Typical oil-based alkyd polymer synthesis involves an alcoholysis reaction of oil (fatty acid ester, usually a fatty acid triglyceride) and polyol compound in the presence of a catalyst at temperatures higher than about 200° C. to produce the corresponding hydroxyl compound or mixture of such compounds, followed by a condensation reaction with a poly acid and/or anhydride compound. A typical reaction scheme is shown in FIG. 1.

"Drying" means the time needed to touch the coating surface without tackiness or damage after applied on the substrate. Although it is true that the "drying" is only achieved when solvent is evaporated, the amount of solvent in the coating products is not the important factor to determine the dry time. Also, the "drying time" is not always related to the chemical crosslinking, For high molecular weight and hard polymer, the drying may be achieved in a short period of time upon solvent evaporation before the chemical crosslinking takes place. In contrast, for low molecular weight and soft polymers, the drying may be only achieved after an extensive chemical crosslinking takes place. Without wishing to be bound by theory, this invention provides a favorable polymer structure for drying through the cyclic structure incorporated into the polymer backbone.

It was found the cyclic ether- and hydroxyl-containing composition formed by heating a sugar alcohol comprising at least six hydroxyl groups, fatty acid ester (oil, such as fatty acid triglyceride), a poly hydroxyl compound (polyol) other than the sugar alcohol, and a catalyst at a temperature of 200° C. or higher and removing the water produced is useful to produce a fast dry alkyd polymer when the resulting cyclic ether- and hydroxyl-containing composition is subsequently subjected to a condensation reaction with a poly acid and/or an anhydride compound. The level of cyclic ether ring structure in the formed cyclic ether- and hydroxyl-containing composition is an important parameter because it determines the dry speed of the resulting alkyd polymer formed when the cyclic ether- and hydroxyl-containing composition is reacted with a poly acid and/or an anhydride compound.

Figure 2:
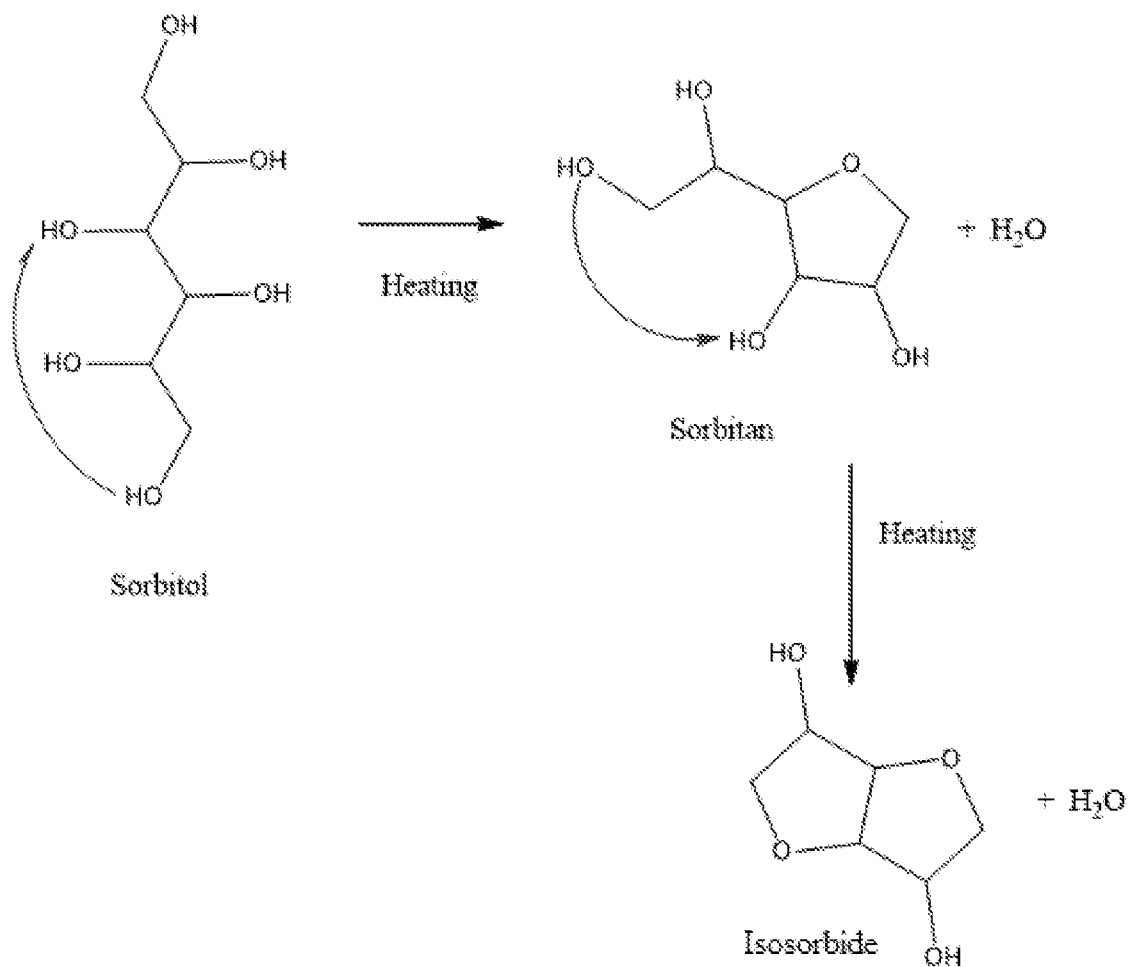
FIG. 2 shows the cyclic ether ring formation reactions of sorbitol.

Two moles of hydroxyl groups in the sugar alcohol generates one mole of water and one mole of a cyclic ether. The reaction is shown in FIG. 2 for sorbitol. Since a mole of water is formed for each cyclic ether ring, it is possible to calculate the amount of cyclic ether in the cyclic ether- and hydroxyl-containing composition based on the amount of water formed. This is done by weighing the amount of water generated during the alcoholysis reaction wherein the sugar alcohol, fatty acid ester (oil), and a poly hydroxyl compound other than the sugar alcohol are reacted together in the presence of a catalyst. As shown in FIG. 2, sorbitol can undergo intramolecular condensation reactions to produce one or optionally two cyclic ether structures. Formation of each of these cyclic ether structures produces a mole of water.

The average number of moles of cyclic ether formed per mole of sorbitol (or other sugar alcohol that can form a cyclic ether) during alcoholysis may be calculated based on the amount of water generated using Equation I, shown below. Note that 18.02 is the molecular weight of water and 182.17 is the molecular weight of sorbitol.

$$\frac{\text{average number of moles of cyclic ether}}{\text{per mole of sorbitol}} = \frac{\text{grams of produced water during alcoholysis}/18.02}{\text{grams of sorbitol}/182.17} \quad \text{Equation I}$$

Figure 3:
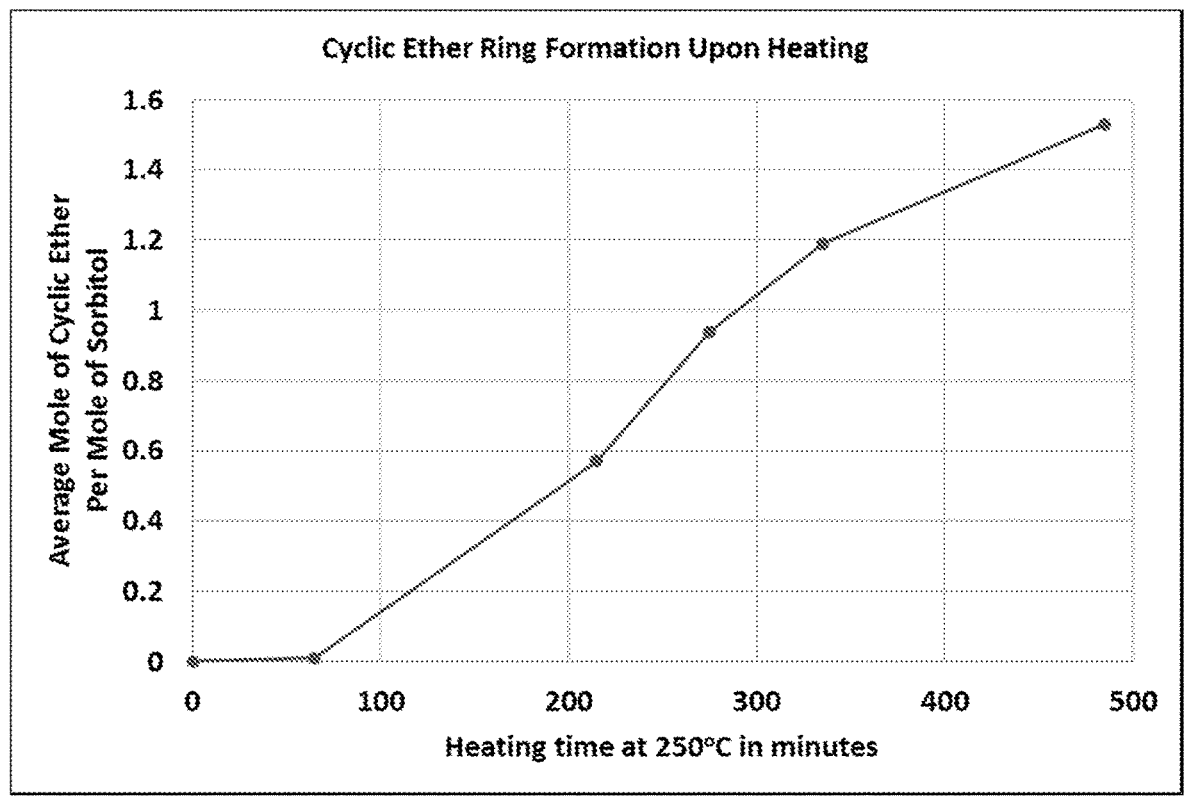
FIG. 3 shows the average moles of cyclic ether structure per mole of sorbitol calculated from the amount of water produced during the intramolecular cyclization of sorbitol at 2500 as a function of time.

FIG. 3 is a graph that shows the average number of moles of cyclic ether structure per mole of sorbitol calculated from the amount of water produced over time due to the cyclization reaction of sorbitol. FIG. 3 thus follows the production of the cyclic ether from sorbitol, and shows a gradual and continuous formation of cyclic ether rings upon heating sorbitol at 250° C. for 8 hours. FIG. 3 demonstrates that at least 6 hours of heating at 250° C. is required to generate at least one mole of cyclic ether per one mole of sorbitol employed.

The number of moles of cyclic ether per gram of cyclic ether- and hydroxyl-containing composition formed during the alcoholysis reaction of oil, polyol and sorbitol may be calculated from the grams of water using the below Equation II $$\begin{aligned}&\text{moles of cyclic per gram of cyclic} \quad \text{Equation II}\\&\quad\text{ether and hydroxyl containing composition} =\\&\quad\frac{\text{grams of water formed during}}{\text{alcoholysis}/\text{molecular weight of water (18.02)}}\\&\quad\overline{\text{total grams of oil, polyol, and sorbitol} -}\\&\quad\text{grams of water formed during alcoholysis}\end{aligned}$$

According to the result shown in FIG. 3, if the alcoholysis reaction mixture is heated for 3 hours at 250° C. as described in Example A3 in CA 2,175,534 A1, about 0.4 mole of cyclic ether ring per mole of sorbitol and thus 0.00027 mole of cyclic ether per gram of cyclic ether- and hydroxyl-containing composition are estimated to form. According to the results that will be shown herein, this is not enough cyclic ether content needed to produce a fast-drying alkyd polymer, when the cyclic ether- and hydroxyl-containing composition is subjected to the condensation reaction with a poly acid and/or an anhydride.

The current invention, in one embodiment, relates to a cyclic ether- and hydroxyl-containing composition having at least 0.001 mole of cyclic ether per gram comprising, in reacted form; 20 to 90 wt. % of one or more fatty acid esters (e.g., oils, such as fatty acid triglycerides); 5 to 80 wt. % of at least one sugar alcohol having at least 6 carbon atoms; and 0 to 50 wt. % of at least one polyol other than the sugar alcohol, wherein the weight percentages are based on the total weight of oil, sugar alcohol and polyol.

The invention also relates, in certain embodiments, to the alkyd polymer that is formed from the cyclic ether- and hydroxyl-containing composition having at least 0.001 mole of cyclic ether per gram comprising, in reacted form 20 to 90 wt. % of one or more fatty esters (oils); 5 to 80 wt. % of at least one sugar alcohol having at least 6 carbon atoms; and 0 to 50 wt. % of at least one polyol other than the sugar alcohol, wherein the weight percentages are based on the total weight of oil, sugar alcohol and polyol. The alkyd polymer composition thus may comprise, in polymerized form: 10-86 weight percent, based on the overall weight of the alkyd polymer composition, of at least one fatty acid ester; 2-76 weight percent, based on the overall weight of the alkyd polymer composition, of at least one sugar alcohol that has at least 6 carbon atoms and is capable of forming at least one cyclic ether ring through intramolecular cyclization; 0-48 weight percent, based on the overall weight of the polymer composition, of the polyol compound other than the sugar alcohol; and 10-50 weight percent of at least one of a poly acid and/or an anhydride compound.

Fatty Acid Esters (Oil)

The oil may be unsaturated, saturated, or a mixture thereof, although in preferred embodiments of the invention the oil contains at least some unsaturation with an iodine value of 80 or higher. Suitable oils include fatty acid esters or triglycerides refined from natural sources (such as various types of crop plants), modified natural triglycerides, as well as synthetic triglycerides. Several examples of suitable oils include, but are not limited to, dehydrated castor oil, soybean oil, tall oil, sunflower oil, coconut oil, castor oil, linseed oil, tung oil, safflower oil, or a mixture thereof.

Sugar Alcohol

The sugar alcohol may include, but is not limited to, sorbitol, mannitol, galactitol, fucitol, iditol, or a combination thereof.

Polyol Other than Sugar Alcohols

The polyol other than the sugar alcohols may include, but is not limited to, pentaerythitrol, dipentaerythritol, neopentyl glycol, trimethylol propane, triethylol propane, trimethylol ethane, hydrogenated bisphenol A, diethylene glycol, triethylene glycol, or a mixture thereof. Typically, the polyol other than the sugar alcohol will contain from two to four hydroxyl groups per molecule. Mixtures of different polyols may be employed.

Catalysts for Alcoholysis

A catalyst may be used to accelerate the trans-esterification reaction (alcoholysis reaction) of oil, sugar alcohol and polyol. Useful catalysts may include, but are not limited to basic and metal-containing catalysts such as LiOH, butyl tin oxide, and dibutyl tin chloride, calcium oxide, lithium neodecanoate, calcium carbonate, sodium hydroxide, calcium naphthenate, or a mixture thereof.

Characterization of the Alkyd Polymer Comprising Cyclic Ether- and Hydroxyl-Containing Composition The alkyd polymer composition further exhibits a plurality of peaks associated with cyclic ether rings in the range of 75-90 ppm on a spectra obtained from $^{13}C$ Nuclear Magnetic Resonance (NMR) spectroscopy and the ratio of signal integration on the $^{13}C$ NMR spectrum between 75 to 90 ppm to signal integration between 126 to 132 ppm is higher than 0.10.

The alkyd polymer composition preferably has a number average molecular weight between 500 and 100,000 Daltons and a weight average molecular weight of the alkyd polymer composition is between 1000 and 400,000 Daltons. These are measured with Gel Permeation Chromatography (GPC) with polystyrene standards.

The present invention relates in certain embodiments to the cyclic ether- and hydroxyl-containing composition having at least 0.001 mole of cyclic ether per gram and method for making it. The cyclic ether- and hydroxyl-containing composition having at least 0.001 mole of cyclic ether per gram of the composition may be used to produce a fast drying alkyd polymer by reacting it with at least one poly acid or anhydride compound, or a combination thereof.

The cyclic ether- and hydroxyl-containing composition having at least 0.001 mole of cyclic ether per gram comprises, in reacted form, 20 to 90 wt. % of one or more oils; 5 to 80 wt. % of a sugar alcohol having at least 6 carbon atoms; and 0 to 50 wt. % of a polyol other than sugar alcohol, the weight percentages being based on the total weight of oil, sugar alcohol and polyol.

Certain embodiments of the invention also relate to the process to produce the cyclic ether- and hydroxyl-containing composition having at least 0.001 mole of cyclic ether per gram. The process involves heating 20 to 90 wt. % of one or more oils (fatty acid esters, e.g., fatty acid triglycerides); 5 to 80 wt. % of a sugar alcohol having at least 6 carbon atoms; and optionally up to 50 wt. % of a polyol other than sugar alcohol, and optionally with up to 2 weight % of the alcoholysis catalyst based on the total charge, at temperatures of higher than 200° C. and removing the needed amount of water calculated by the above Equation II.

It is desirable that the preparation of the cyclic ether- and hydroxyl-containing composition of the present invention be conducted in the absence of the poly acid compound or anhydride compound that is a part of the alkyd polymer to obtain the maximum level of cyclic ether structure.

If acid compounds are present, the hydroxyl groups of the sugar alcohol are consumed for the ester formation with them and fewer hydroxyl groups are available for the formation of the cyclic ether- and hydroxyl-containing composition. The cyclic ether- and hydroxyl-containing composition of the present invention may be further reacted with the poly acid compound and/or the anhydride compound to produce a fast drying alkyd.

The present invention also relates to the alkyd polymer composition comprising, in polymerized form: 50 to 95 wt. % cyclic ether- and hydroxyl-containing composition having at least 0.001 mole of cyclic ether per gram and 5 to 200 wt. % poly acid compound and/or anhydride compound, the weight percentages being based on the total weight of cyclic ether- and hydroxyl-containing composition and poly acid compound and/or anhydride compound.

Poly Acids and Anhydride Compounds

A compound containing two or more carboxylic acid groups per molecule is referred to herein as a poly acid. For example, such a compound may contain two, three, four or more carboxylic acid groups per molecule. An anhydride compound which is capable of producing two ester linkages with the hydroxyl compound may also be employed. Useful poly acid compounds and anhydride compounds may include, but are not limited to, saturated aliphatic diacids, unsaturated cyclic aliphatic anhydrides, saturated cyclic aliphatic anhydrides, aromatic diacids, aromatic triacids, aromatic anhydrides, and the like such as adipic acid, phthalic anhydride, hexahydro phthalic anhydride, maleic anhydride, succinic anhydride, tetrahydro phthalic anhydride, isophthalic acid, terephthalic acid, trimellitic anhydride, trimellitic acid, 5-(sodiosulfo)-isophthalic acid, pyromellitic dianhydride, or a mixture thereof.

General Preparation Methods for Alkyd Polymers

The alkyd polymer composition may be prepared using conventional polymerization techniques. For example, the reagents that will form the polymerized units in the alkyd polymer composition may be charged into a reactor. Once the reagents are charged into the reactor, the mixture is heated to a temperature that is between about 200° C. and 300° C. This temperature is maintained until the alkyd polymer has an acid value below typically 20 as determined according to ASTM test method D1639 (ASTM International, West Conshohocken, PA). Alternatively, the reaction temperature may be between about 210° C. and 270° C.; alternatively, between about 210° C. and 250° C.; alternatively, about 210° C., 220° C., 230° C., or 240° C. One of ordinary skill in the art will also understand that the reagents may be added to the reaction container simultaneously or consecutively. However, as described herein, it is important that the alcoholysis step during which the cyclic ether ring structure is formed is performed in the absence of the poly acid and/or anhydride compound and for a long enough time at a sufficiently high temperature to produce the cyclic ether- and hydroxyl-containing composition comprising a minimum level of the cyclic ether ring structure. One of ordinary skill in the art will further understand that the temperature may be reduced below the reaction temperature (i.e., below 200° C.) and then increased again to the reaction temperature during the course of the reaction for various purposes (for example, to add another reagent or for intermediate reactions to occur).

Further Alkyd Polymer Modification

The formed alkyd polymer may be further modified by performing radical polymerization of acrylic monomers, vinyl monomers, or a mixture thereof in the presence of the formed alkyd polymer. After this radical polymerization, which is done on a mixture comprising the formed alkyd polymer and the acrylic and/or vinyl monomers, a part of acrylic/vinyl polymer is chemically grafted to the alkyd polymer and a part of acrylic/vinyl polymer exists as a separate polymer.

Therefore, the alkyd polymer composition may further comprise one or more of an acrylic polymer, a vinyl polymer, or mixtures thereof. These acrylic and/or vinyl polymers may be either grafted to the alkyd polymer backbone and/or be included in the composition as separate acrylic and/or vinyl polymers.

Uses of the Alkyd Polymer

The alkyd polymer composition may be used in a variety of product formulations. These product formulations may be designed for use, without limitation, as coatings, paints, adhesives, sealants, or inks.

Carriers

Generally, such products designed for coatings comprise the alkyd polymer diluted with an organic carrier in order to achieve the desired viscosity for a coating application. Non-limiting examples of an organic carrier are: a drying oil, an organic solvent, a varnish, a lacquer, a resin solution, an enamel, or an oil-based paint. When desirable, the organic solvent may be selected from, but is not limited to, aliphatic solvents, aromatic solvents, ketone solvents, glycol ether solvents, ester solvents, and carbonate solvents such as mineral spirits, naphtha, methyl amyl ketone, xylene, toluene, methyl isobutyl ketone, ethyl acetate, diethylene glycol monobutyl ether acetate, ethylene glycol monobutyl ether acetate, dipropylene glycol monobutyl ether acetate, propylene glycol monobutyl ether acetate, ethylene glycol monobutyl ether, isobutyl acetate, n-propyl acetate, ethylene glycol monopropyl ether, ethyl 3-ethoxypropionate, n-butyl propionate, dipropylene glycol monobutyl ether, triethylene glycol monobutyl ether, methyl isoamyl ketone, oxo-hexyl acetate, tripropylene glycol monomethyl ether, aromatic hydrocarbon, propylene glycol phenyl ether, diethylene glycol monomethyl ether, diethylene glycol monoethyl ether acetate, isophorone, methyl propyl ketone, n-butyl acetate, propylene glycol monomethyl ether, para-chlorobenzotrifluoride, acetone, dimethyl carbonate, acetone, t-butylacetate or a mixture thereof. Other non-limiting examples of organic solvents comprise mineral spirits and/or xylene and/or methyl amyl ketone. These solvents may also be included during the polymerization process and can be removed or reduced at the end of the synthesis process using processes such as are known in the art, e.g., conventional or vacuum distillation.

Additives

The product formulations may be further modified by the addition of one or more additives, including without limitation additional polymers, the metal driers, pigments or colorants, fillers, dispersants or surfactants, plasticizers, defoamers, thickeners, biocides, solvents, rheology modifiers, wetting or spreading agents, leveling agents, conductive additives, thermal insulating filler, adhesion promoters, anti-blocking agents, anti-cratering agents or anti-crawling agents, corrosion inhibitors, anti-static agents, flame retardants, optical brighteners, UV absorbers or other light stabilizers, chelating agents, cross-linking agents, flattening agents, flocculants, humectants, insecticides, lubricants, odorants, oils, waxes or anti-slip aids, soil repellants, and stain resistant agents. Useful cross-linking agents include, but are not limited to, multi-functional isocyanates, melamine resins, and mixtures thereof. Metal driers are catalysts that speed up the oxidative crosslinking reaction. Non-limiting examples include but are not limited to: neodymium catalysts, cobalt-based catalysts, and aromatic heterocyclic diamines.

Methods of Using the Alkyd Polymer Formulations

The product formulations may be applied by conventional techniques, such as dipping, brushing, flowing, or spraying to name a few, onto a variety of substrate surfaces. The substrates may include without limitation, wood, fabricated wood, paper, cardboard, textiles, synthetic resins, ceramics, ferrous metals, non-ferrous metals, stone, concrete, plaster, and the like.

The product formulation may be used in an indoor or outdoor application. Outdoor applications may include, without limitation, metal coating applications. Additional outdoor applications may include, but not be limited to, rail car coating, agricultural machinery coating, automobile parts coating, wood coatings, log cabin coatings and deck stains. The alkyd polymer composition in the product formulation formed thereof may provide coatings for automotive, industrial, construction and residential housing applications, including for example, without limitation, wood stains, porch and deck stains, glossy top coats, traffic paints, general metal coatings, kitchen cabinetry coatings, automobile refinish, lawn and garden equipment coatings, bus and truck top coatings, gloss trim enamels, metal primers, light duty maintenance coatings, furniture coatings, stain blocking coatings, appliance coatings, dumpster coatings, heavy duty equipment coatings, industrial equipment coatings, and sash and trim enamels. The product formulations may also be useful for adhesive and ink applications.

A method of using a product formulation that includes the alkyd polymer composition as described above and further defined herein is provided. This method generally comprises of providing the product formulation; applying the product formulation to the surface of a substrate; and allowing the product formulation to dry and adhere to the surface of the substrate.

The following specific examples are given to illustrate the cyclic ether- and hydroxyl-containing compositions and the alkyd polymer compositions and should not be construed to limit the scope of the disclosure. Those skilled in the art, in light of the present disclosure, will appreciate that many changes can be made in the specific embodiments which are disclosed herein and still obtain alike or similar result without departing from or exceeding the spirit or scope of the disclosure. One skilled in the art will further understand that any properties reported herein represent properties that are routinely measured and can be obtained by multiple different methods. The methods described herein represent one such method and other methods may be utilized without exceeding the scope of the present disclosure.

It should be understood that while the examples disclosed herein describe the exemplary production of a cyclic ether- and hydroxyl-containing composition and an alkyd polymer obtained therefrom, these examples are exemplary only and other fatty acid esters, sugar alcohols, poly acids or compounds capable of forming poly acids, oils and polyalcohols other than sugar alcohols may be used in the practice of this invention.

Various non-limiting aspects of the invention may be summarized as follows:

Aspect 1: An alkyd polymer composition comprising, in polymerized form:
 a) between 10 weight percent and 80 weight percent, based on the overall weight of the alkyd polymer composition, of at least one fatty acid ester;
 b) between 2 weight percent and 76 weight percent, based on the overall weight of the alkyd polymer composition, of at least one sugar alcohol, wherein the sugar alcohol comprises at least 6 carbon atoms and wherein the sugar alcohol is capable of forming at least one cyclic ether ring through intramolecular cyclization; and
 c) between 10 weight percent and 50 weight percent, based on the overall weight of the alkyd polymer composition, of at least one of a poly acid or an anhydride or a combination thereof;
 wherein the alkyd polymer composition exhibits a plurality of peaks associated with cyclic ether rings in the range of 75-90 ppm on a spectra obtained from $C^{13}$ Nuclear Magnetic Resonance (NMR) spectroscopy and the ratio of signal integration between 75 to 90 ppm to signal integration between 126 to 132 ppm is higher than 0.10.

Aspect 2: The alkyd polymer composition according to aspect 1 wherein the sugar alcohol is capable of forming at least two cyclic ether rings through intramolecular cyclization.

Aspect 3: The alkyd polymer composition according to aspect 1 or aspect 2 further comprising, in polymerized form, d) at least one polyol comprising two or more hydroxyl functional groups per molecule, wherein the at least one polyol does not comprise a sugar alcohol.

Aspect 4: The alkyd polymer composition according to aspect 3 wherein the alkyd polymer composition comprises, in polymerized form, 2 to 48 weight percent d), based on the overall weight of the alkyd polymer composition.

Aspect 5: The alkyd polymer composition according aspect 3 or aspect 4, wherein the at least one polyol is selected from the group consisting of glycerol, pentaerythritol, dipentaerythritol, neopentyl glycol, trimethylol propane, trimethylol ethane, hydrogenated bisphenol A, diethylene glycol, triethylene glycol, polyethylene oxide glycol, polypropylene oxide glycol and mixtures thereof.

Aspect 6: The alkyd polymer composition according to any of aspects 3-5 wherein the at least one polyol comprises pentaerythritol.

Aspect 7: The alkyd polymer composition according to any of aspects 1-6, wherein the alkyd polymer composition exhibits a dry to touch time of 10 hours or less according to ASTM D1640 test method at 20 to 25° C., 50 to 60% relative humidity when mixed with 2.504 weight % of 12% neodymium, 0.501 weight % of 11.9-12.1% cobalt octanoate salt, and 0.195 weight % of 29-31% bipyridyl, based on the polymer solids and diluted with mineral spirits to achieve 70 weight % non-volatile material and cast onto a glass plate with a bar film applicator with a wet film thickness of 3 mil.

Aspect 8: The alkyd polymer composition according to any of aspects 1-7, wherein the at least one sugar alcohol comprises at least one sugar alcohol selected from the group consisting of, fucitol, galactitol, iditol, mannitol, sorbitol and mixtures thereof.

Aspect 9: The alkyd polymer composition according to any of aspects 1-8 wherein the at least one sugar alcohol comprises sorbitol.

Aspect 10: The alkyd polymer composition according to any of aspects 1-9 wherein the at least one fatty acid ester comprises dehydrated castor oil, castor oil, soybean oil, tall oil, sunflower oil, coconut oil, linseed oil, tung oil, safflower oil, or mixtures thereof.

Aspect 11: The alkyd polymer composition according to any of aspects 1-10 wherein the at least one fatty acid ester comprises soybean oil.

Aspect 12: The alkyd polymer composition according to any of aspects 1-11 wherein the at least one of a poly acid and/or an anhydride comprises at least one compound selected from the group consisting of phthalic anhydride, adipic acid, maleic anhydride, succinic anhydride, hexahydrophthalic anhydride, tetrahydrophthalic anhydride, succinic acid, sebacic acid, terephthalic acid, isophthalic acid, trimellitic anhydride, trimellitic acid, 5-(sodiosulfo)-isophthalic acid, pyromellitic dianhydride and mixtures thereof.

Aspect 13: The alkyd polymer composition according to any of aspects 1-12 wherein the at least one of a poly acid and/or an anhydride comprises phthalic anhydride.

Aspect 14: The alkyd polymer composition according to any of aspects 1-13 wherein the weight average molecular weight of the alkyd polymer composition is between 500 and 100,000 Daltons.

Aspect 15: A product formulation for use as a coating, a paint, an adhesive, a sealant, an ink, or a binder, wherein the product formulation comprises the alkyd polymer composition according to any of aspects 1-14.

Aspect 16: A cyclic ether- and hydroxyl-containing composition comprising, in trans-esterified form:

a) between 20 and 90 weight percent of at least one fatty acid ester,
b) between 5 and 80 weight percent of at least one sugar alcohol having at least 6 carbon atoms, wherein the sugar alcohol is capable of forming at least one cyclic ether ring through intramolecular cyclization, wherein the cyclic ether- and hydroxyl-containing composition exhibits a plurality of peaks associated with cyclic ether rings in the range of 75-90 ppm on a spectra obtained from $C^{13}$ Nuclear Magnetic Resonance (NMR) spectroscopy and the ratio of signal integration between 75 to 90 ppm to signal integration between 126 to 132 ppm is higher than 0.25.

Aspect 17: The cyclic ether- and hydroxyl-containing composition according to aspect 16 wherein the sugar alcohol is capable of forming at least two cyclic ether rings through intramolecular cyclization.

Aspect 18: The cyclic ether- and hydroxyl-containing composition according to aspect 16 or aspect 17, further comprising, in trans-esterified form: c) at least one polyol comprising two or more hydroxyl functional groups per molecule wherein the polyol does not comprise a sugar alcohol.

Aspect 19: The cyclic ether- and hydroxyl-containing composition according aspect 18, wherein the at least one polyol comprises, in trans-esterified form, 0.01 to 50 weight percent of the cyclic ether- and hydroxyl-containing composition.

Aspect 20: The cyclic ether- and hydroxyl-containing composition according to aspect 18 or aspect 19 wherein the at least one polyol is selected from the group consisting of glycerol, pentaerythritol, dipentaerythritol, neopentyl glycol, trimethylol propane, trimethylol ethane, hydrogenated bisphenol A, diethylene glycol, triethylene glycol, polyethylene oxide glycol, polypropylene oxide glycol and mixtures thereof.

Aspect 21: The cyclic ether- and hydroxyl-containing composition according to any of aspects 18-20 wherein the at least one polyol other than sugar alcohol comprises pentaerythritol.

Aspect 22: The cyclic ether- and hydroxyl-containing composition according to any of aspects 16-21 wherein the at least one sugar alcohol comprises at least one sugar alcohol selected from the group consisting of fucitol, galactitol, iditol, mannitol, sorbitol, and mixtures thereof.

Aspect 23: The cyclic ether- and hydroxyl-containing composition according to any of aspects 16-22 wherein the at least one sugar alcohol comprises sorbitol.

Aspect 24: The cyclic ether- and hydroxyl-containing composition according to any of aspects 16-23 wherein the at least one fatty acid ester comprises dehydrated castor oil, castor oil, soybean oil, tall oil, sunflower oil, coconut oil, linseed oil, tung oil, safflower oil, or mixtures thereof.

Aspect 25: The cyclic ether- and hydroxyl-containing composition according to aspect 24 wherein the at least one fatty acid ester comprises soybean oil.

Aspect 26: A method to produce an alkyd polymer composition, wherein the method comprises the steps of:
a) alcoholysis of an alcoholysis mixture, wherein the alcoholysis mixture comprises:
i. between 20 and 90 weight percent based on the weight of the alcoholysis mixture of at least one fatty acid ester,
ii. between 5 and 80 weight percent based on the weight of the alcoholysis mixture of at least one sugar alcohol having at least 6 carbon atoms, wherein the at least one sugar alcohol is capable of forming one or two cyclic ether rings through intramolecular cyclization,
iii. no poly acid nor an anhydride compound;

wherein the alcoholysis is performed at an alcoholysis temperature and wherein the alcoholysis produces, at the end of an alcoholysis time, a cyclic ether- and hydroxyl-containing composition which exhibits a plurality of peaks in the range of 75-90 ppm on a spectra obtained from $C^{13}$ Nuclear Magnetic Resonance (NMR) spectroscopy and wherein the alcoholysis produces at the end of the alcoholysis time at least 0.001 mole of cyclic ether derived from the sugar alcohol per gram of cyclic ether- and hydroxyl-containing composition as determined by grams of produced water, wherein the grams of produced water and the moles of cyclic ether derived from the sugar alcohol per gram of cyclic ether- and hydroxyl-containing composition are related by the formula:

$$\frac{\text{moles of cyclic ether derived from the sugar alcohol}}{\text{gram of cyclic ether and hydroxyl containing composition}} = \frac{\text{grams of produced water}/18.02}{\text{total grams of alcoholysis mixture} - \text{grams of produced water}}$$

b) condensation of the cyclic ether- and hydroxyl-containing composition produced by the alcoholysis step a) with between 5 and 200 weight percent, based on the weight of the cyclic ether- and hydroxyl-containing composition of at least one of a poly acid and/or an anhydride compound, wherein the condensation step b) takes place after the alcoholysis step a), wherein the condensation step b) takes place at a condensation temperature, and wherein the condensation step b) forms the alkyd polymer composition.

Aspect 27: The method according to aspect 26 wherein the at least one sugar alcohol is capable of producing at least two cyclic ether rings through intramolecular cyclization.

Aspect 28: The method according to aspect 26 or aspect 27 wherein the alcoholysis mixture further comprises iv. at least one polyol comprising two or more hydroxyl functional groups per molecule, wherein the at least one polyol does not comprise a sugar alcohol.

Aspect 29: The method according to aspect 28 wherein the at least one polyol comprising two or more hydroxyl functional groups per molecule is present at 4 to 50 weight percent of the alcoholysis mixture.

Aspect 30: The method according to aspect 28 or aspect 29 wherein the at least one polyol comprising two or more hydroxyl functional groups per molecule comprises a polyol selected from the group consisting of glyceraol, pentaerythritol, dipentaerythritol, neopentyl glycol, trimethylol propane, trimethylol ethane, hydrogenated bisphenol A, diethylene glycol, triethylene glycol, polyethylene oxide glycol, polypropylene oxide glycol, and mixtures thereof.

Aspect 31: The method according to aspect 30 wherein the at least one polyol comprises pentaerythritol.

Aspect 32: The method according to any of aspects 26-31 wherein the at least one sugar alcohol comprises at least one sugar alcohol selected from the group consisting of fucitol, galactitol, iditol, mannitol, sorbitol, and mixtures thereof.

Aspect 33: The method according to any of aspects 26-31 wherein the at least one sugar alcohol comprises sorbitol.

Aspect 34: The method according to any of aspects 26-33 wherein the alcoholysis mixture further comprises at least one catalyst.

Aspect 35: The method according to aspect 34 wherein the at least one catalyst comprises at least one catalyst selected from the group consisting of butyl tin oxide, dibutyl tin chloride, calcium oxide, lithium neodecanoate, calcium carbonate, lithium hydroxide, sodium hydroxide, calcium napthenate, and mixtures thereof.

Aspect 36: The method according to aspect 34 or aspect 35 wherein the at least one catalyst comprises lithium neodecanoate.

Aspect 37: The method according to any of aspects 26-36 wherein the at least one fatty acid ester comprises dehydrated castor oil, castor oil, soybean oil, tall oil, sunflower oil, coconut oil, linseed oil, tung oil, safflower oil, or mixtures thereof.

Aspect 38: The method according to any of aspects 26-37 wherein the at least one fatty acid ester comprises soybean oil.

Aspect 39: The method according to any of aspects 26-38 wherein the at least one of a poly acid and/or an anhydride compound comprises a compound selected from the group consisting of phthalic anhydride, adipic acid, maleic anhydride, succinic anhydride, hexahydrophthalic anhydride, tetrahydrophthalic anhydride, succinic acid, sebacic acid, terephthalic acid, isophthalic acid, trimellitic anhydride, trimelletic acid, 5-(sodiosulfo)-isophthalic acid, pyromellitic dianhydride and mixtures thereof.

Aspect 40: The method according to aspect 39 wherein the at least one of a polyol or an anhydride compound comprises phthalic anhydride.

Aspect 41: The method according to any of aspects 26-40 wherein the alcoholysis temperature is at least 250° C. and the alcoholysis time is at least 3 hours.

Aspect 42: The method according to any of aspects 26-40 wherein the alcoholysis temperature is at least 200° C. and the alcoholysis time is at least 6 hours.

Aspect 43: The method according to any of aspects 26-40 wherein the condensation temperature is at least 200° C.

EXAMPLES

Example 1: Synthesis of the Novel Cyclic Ether- and Hydroxyl-Containing Composition with Various Levels of Cyclic Ether Ring Structure The following alcoholysis mixture, shown in Table 1 was prepared:

TABLE 1

| Alcoholysis mixture: | | |
|---|---|---|
| Charge | Material | Grams |
| (A) | Soybean Oil | 582.0 |
| | mono-pentaerythritol (Perstorp) | 37.0 |
| | 2% Lithium Ten Cem ® (Lithium salt of neodecanoic acid in aqueous solution) (Borchers) | 2.5 |
| | Sorbitol | 178.0 |

Charge (A) was added into a flask equipped with a cold water condenser, Dean Stark receiver, and a nitrogen blanket. The temperature was raised to 250° C. and held at that temperature until various amounts of water were collected. In this way, three different starting materials, called 1-A, 1-1 and 1-C could be formed, each with a different number of moles of cyclic ether per gram of the cyclic ether- and hydroxyl-containing composition formed during the alcoholysis reaction. The viscosity of the alcoholysis mixture was also measured by Brookfield Viscometer with spindle #4 at 60 rpm. The results are shown in Table 2.

TABLE 2

| Various number of moles of cyclic ether hydroxyl compound per gram of the hydroxyl compound formed during the alcoholysis reaction. | | | | | | |
|---|---|---|---|---|---|---|
| Example | Water Removed (grams) | Average Number of Cyclic Ether Rings Formed per Sorbitol Molecule | Moles of Cyclic Ether per Gram of Cyclic Ether-and Hydroxyl-Containing Composition | Weight Average Molecular Weight | Viscosity (centipoise) | Reaction Duration at 250° C. |
| 1-A comparative | 2 | 0.114 | 0.00014 | Not measured | Phase separated | 1 hour 40 minutes |
| 1-B comparative | 8 | 0.454 | 0.00056 | 889 | 2300 | 3 hours 50 minutes |
| 1-C invention | 19 | 1.079 | 0.00135 | 917 | 950 | 8 hours |

The viscosity measurement for the cyclic ether- and hydroxyl-containing composition surprisingly shows that the formation of more cyclic ether ring structure leads to lower viscosity despite no appreciable molecular weight change. This indicates that the formation of cyclic ether structure reduces the material viscosity. Low viscosity of cyclic ether- and hydroxyl-containing composition is beneficial to produce fast dry alkyd product since higher molecular weight is possible at a given viscosity and higher molecular weight always results in fast surface dry.

Example 2—Comparative: Synthesis of Alkyd Polymer without the Cyclic Ether- and Hydroxyl-Containing Composition, According to *Farbe Und Lack* Vol 83, Pages 798-804, 1979

The following two charges (A) and (B), shown in Table 3 below were prepared:

TABLE 3

Starting materials for Example 2-Comparative:

| Charge | Material | Grams |
|---|---|---|
| (A) | Soybean Oil | 582.0 |
|  | mono-pentaerythritol (Perstorp) | 37.0 |
|  | 2% Lithium Ten Cem ® (Lithium salt of neodecanoic acid in aqueous solution) (Borchers) | 2.5 |
| (B) | Sorbitol | 178.0 |
|  | Phthalic anhydride | 210.0 |
|  | Xylene | 20.0 |

Charge (A) was added into a flask equipped with a cold water condenser, Dean Stark receiver, and a nitrogen blanket. The temperature was raised to 250° C. and held for 2 hours. Charge (B) was added to a reaction flask and the temperature was raised to 240° C. for the condensation process. The reaction was aborted due to the formation of solid aggregates.

This comparative example clearly demonstrates that it is not possible to introduce such a high level of sorbitol as 17.6% into the alkyd polymer without the formation of the cyclic ether- and hydroxyl-containing composition of the current invention since co-existence of phthalic anhydride and the large amount of sorbitol in the second stage causes aggregate formation.

Example 3—According to the Invention: Synthesis of Alkyd Polymer Compositions with the Formation of High Level of Cyclic Ether Structure in the Alcoholysis Reaction The following three charges (A), (B) and (C) were prepared, as shown in Table 4.

TABLE 4

Starting materials for Example 3 (according to the invention):

| Charge | Material | Grams |
|---|---|---|
| (A) | Soybean Oil | 582.0 |
|  | mono-pentaerythritol (Perstorp) | 37.0 |
|  | 2% Lithium Ten Cem ® (Lithium salt of neodecanoic acid in aqueous solution) (Borchers) | 2.5 |
|  | Sorbitol | 178.0 |
| (B) | Phthalic anhydride | 210.0 |
|  | Xylene | 20.0 |
| (C) | Mineral Spirits | 80.0 |

Charge (A) was added into a flask equipped with a cold water condenser, Dean Stark receiver, and a nitrogen blanket. The temperature was raised to 250° C. and held at that temperature for 7 hours 55 minutes until 27 grams of water was collected. Charge (B) was added to a reaction flask and the temperature was raised to 240° C. for condensation process. The process continued until acid value dropped below 10. The flask was cooled and Charge (C) was added. The formed alkyd polymer resin had 90.0 percent non-volatile material by weight (NVM), $Z_6$+6/7 Gardner Holdt Viscosity, and 5.0 Acid Value measured by 0.1 KOH titrant.

Example 4—Comparative: Synthesis of Alkyd Polymer Compositions with the Formation of Medium Level of Cyclic Ether Structure in the Alcoholysis Stage The following three charges (A), (B) and (C) were prepared, as shown in Table 5.

TABLE 5

Starting materials for Example 4-Comparative

| Charge | Material | Grams |
|---|---|---|
| (A) | Soybean Oil | 582.0 |
|  | mono-pentaerythritol (Perstorp) | 37.0 |
|  | 2% Lithium Ten Cem ® (Lithium salt of neodecanoic acid in aqueous solution) (Borchers) | 2.5 |
|  | Sorbitol | 178.0 |
| (B) | Phthalic anhydride | 210.0 |
|  | Xylene | 20.0 |
| (C) | Mineral Spirits | 80.0 |

Charge (A) was added into a flask equipped with a cold water condenser, Dean Stark receiver, and a nitrogen blanket. The temperature was raised to 250° C. and held at temperature for 3 hours 10 minutes until 10 grams of water was collected. Charge (B) was added to a reaction flask and the temperature was raised to 240° C. for the condensation process to produce the alkyd polymer. The process continues until acid value drops below 10. The flask was cooled and Charge (C) was added. The formed alkyd polymer resin had 89.6 NVM, $Z_7$ Gardner Holdt Viscosity, and 4.4 Acid value.

Example 5—Comparative: Synthesis of Alkyd Polymer Compositions with the Formation of Low Level of Cyclic Ether Structure in the Alcoholysis Stage The following three charges, (A), (B) and (C) as shown in Table 6 were prepared.

TABLE 6

Starting materials for the synthesis of alkyd polymer with a low level of cyclic ether structure:

| Charge | Material | Grams |
|---|---|---|
| (A) | Soybean Oil | 582.0 |
|  | mono-pentaerythritol (Perstorp) | 37.0 |
|  | 2% Lithium Ten Cem ® (Lithium salt of neodecanoic acid in aqueous solution) (Borchers) | 2.5 |
|  | Sorbitol | 178.0 |
| (B) | Phthalic anhydride | 210.0 |
|  | Xylene | 20.0 |
| (C) | Mineral Spirits | 80.0 |

Charge (A) was added into a flask equipped with a cold water condenser, Dean Stark receiver, and a nitrogen blanket. The temperature was raised to 250° C. and held for 1 hour 40 minutes until 5 grams of water is collected. Charge (B) was added to a reaction flask and the temperature was raised to 240° C. for condensation process. The process continues until acid value drops below 10. The flask was cooled and Charge (C) was added. The formed alkyd polymer resin had 89.6 NVM, Z6+5/6 Gardner Holdt Viscosity, and 4.4 Acid value.

Example 6: Surface Dry Time and Molecular Weight Measurement

A catalyst package for the chemical crosslinking drying step was prepared by blending 18 gram Dri-Cat 12 (neodymium catalyst from Dura Chemicals), 3.6 gram 12% Co-Hex Cem (cobalt-based catalyst from Borchers), and 1.4 gram Dri-Rx HF (solution of 2, 2'-Bipyridyl, an aromatic heterocyclic diamine in 2-butoxyethanol from Borchers). The catalyst drier package was mixed with the alkyd polymers produced in Examples 2 to 4 at 3.2 weight percent based on polymer solids and diluted with mineral spirits to achieve 70 weight percent non-volatile material. The film was cast on a glass plate with a bar film applicator with 3 wet mil thickness.

Dry-hard time of the films were measured according to ASTM D1640 test method at the ambient condition of 20 to 25° C. and 50 to 60% relative humidity. The molecular weight of the alkyd polymers was measured with Gel Permeation Chromatography using polystyrene as standard.

A summary of the dry time and the molecular weight of the polymers made in Examples 3-5 are shown below in Table 7.

TABLE 7

Summary of surface dry time and molecular weight

| Alkyd Resin | Number of Cyclic Ether Rings per Sorbitol Molecule | Moles of Cyclic Ether per Gram of Cyclic Ether-and Hydroxyl-Containing Composition | Heating time at 250° C. | Mn/Mn | Viscosity (Gardner-Holdt) | Dry to Touch Time (hours) |
|---|---|---|---|---|---|---|
| Example 3 (invention) | 1.54 | 0.00195 | 7 hours, 55 minutes | 2812/12062 | $Z_6$ + 6/7 | 6 |
| Example 4 (comparative) | 0.57 | 0.00071 | 3 hours, 10 minutes | 2539/8639 | $Z_7$ | 11 |
| Example 5 (comparative) | 0.29 | 0.00035 | 1 hour, 40 minutes | 2487/8567 | $Z_6$ + 5/6 | 15-24 |

Despite the similar viscosity of three alkyd polymers in Examples 3, 4 and 5, the alkyd polymer of Example 3 prepared from the cyclic ether- and hydroxyl-containing composition with 0.00195 mole of cyclic ether per gram shows the fastest surface dry. However, the alkyd polymers of Comparative Examples 4 and 5 produced from the cyclic ether- and hydroxyl-containing composition with less than 0.001 moles of cyclic ether per gram of cyclic ether exhibited significantly slower surface dry.

These results clearly highlight the importance of introducing more than 0.001 mole of cyclic ether per gram of the cyclic ether- and hydroxyl-containing composition formed from the alcoholysis reaction of oil, polyol, and sorbitol that are necessary in order to produce fast dry alkyd polymers.

Example 7: $^{13}$C NMR Studies of the Cyclic Ether- and Hydroxyl-Containing Compositions and the Alkyd Polymers $^{13}$C nuclear magnetic resonance (NMR) was utilized to identify and quantify the cyclic ether ring structure in the cyclic ether- and hydroxyl-containing composition and the resulting alkyd polymer after reaction of the cyclic ether- and hydroxyl-containing composition with phthalic anhydride. Samples were prepared by placing ~20 drops of the viscous samples into separate 5 mm NMR tubes with acetone-$d_6$ and were left at room temperature overnight. The NMR spectra were acquired on the Bruker AV III HD 500 (11.7 T) spectrometer equipped with a 5 mm TXO probe at 50° C. One Pulse $^{13}$C NMR technique and Distortionless Enhancement by Polarization Transfer (DEPT)$^{13}$C NMR technique were employed to measure the cyclic ether structure in the materials.

Alkyd polymer produced without sorbitol was also included for this NMR study as a control.

Figure 4:
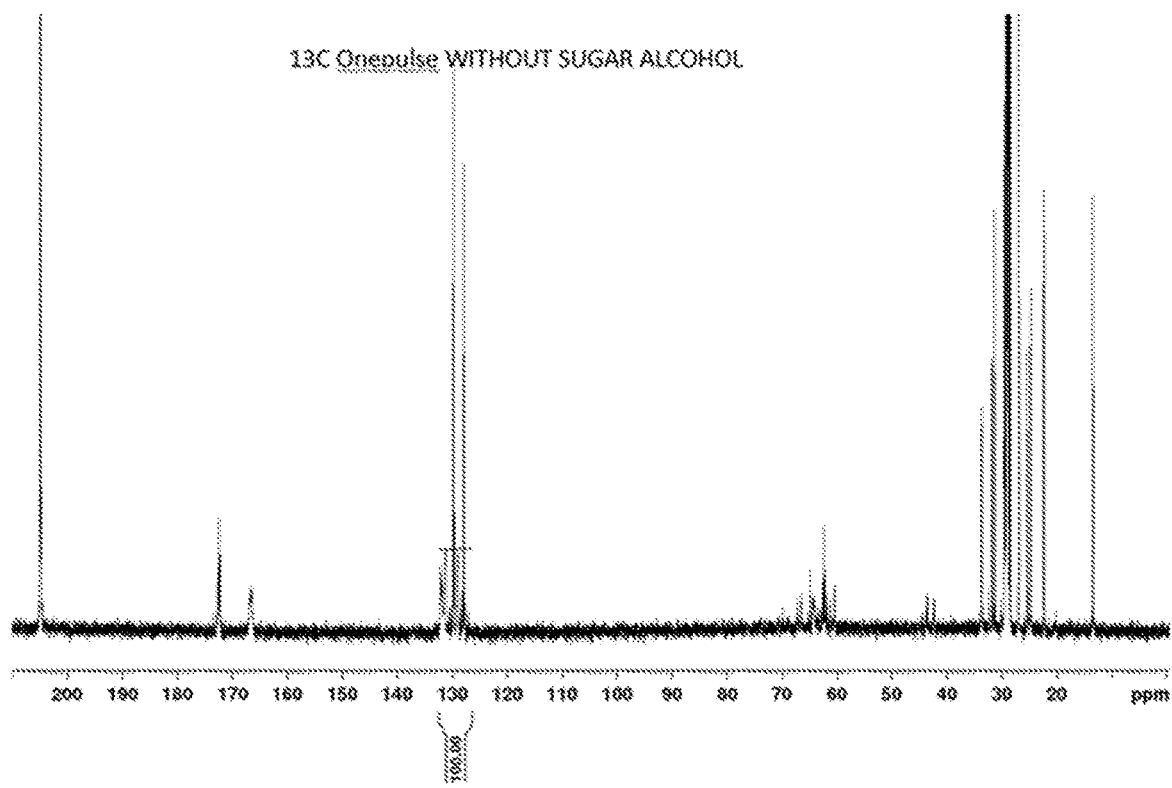
FIG. 4 shows the $^{13}C$ One Pulse NMR spectrum of a control alkyd polymer composition prepared without sorbitol.
Figure 5:
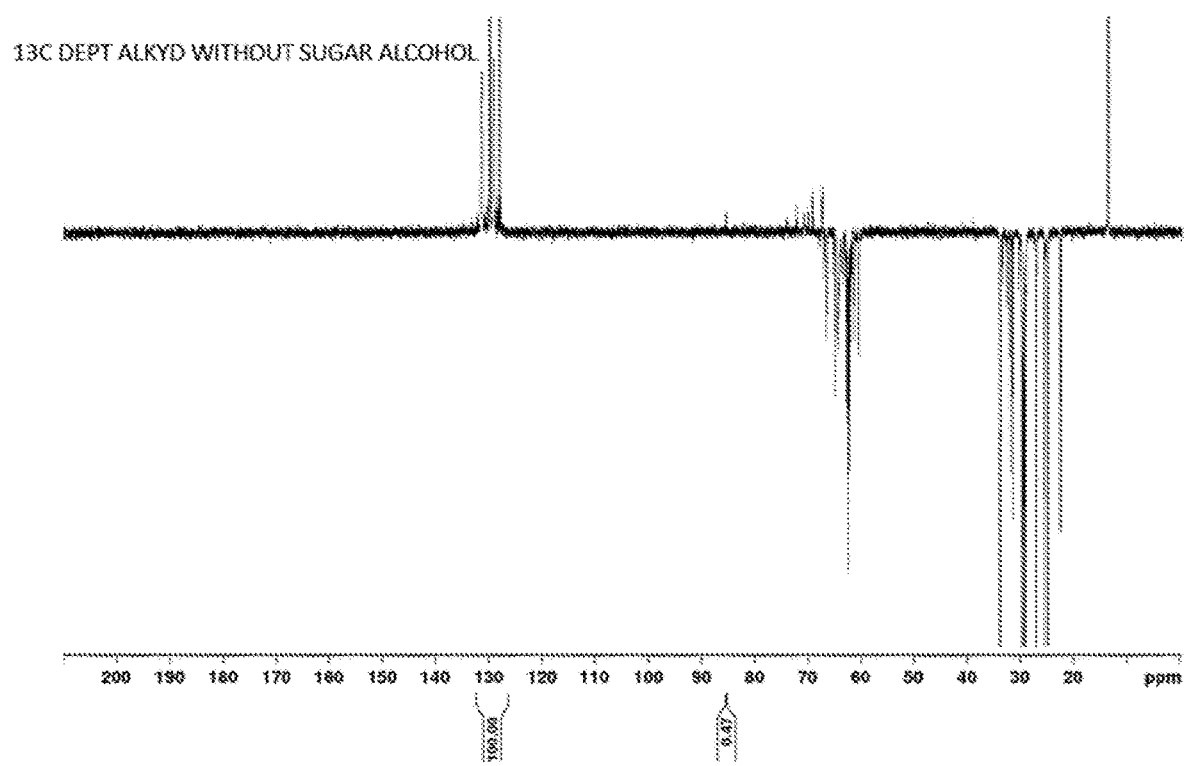
FIG. 5 shows the $^{13}C$ DEPT NMR spectrum of a control alkyd polymer composition prepared without sorbitol.
Figure 8:
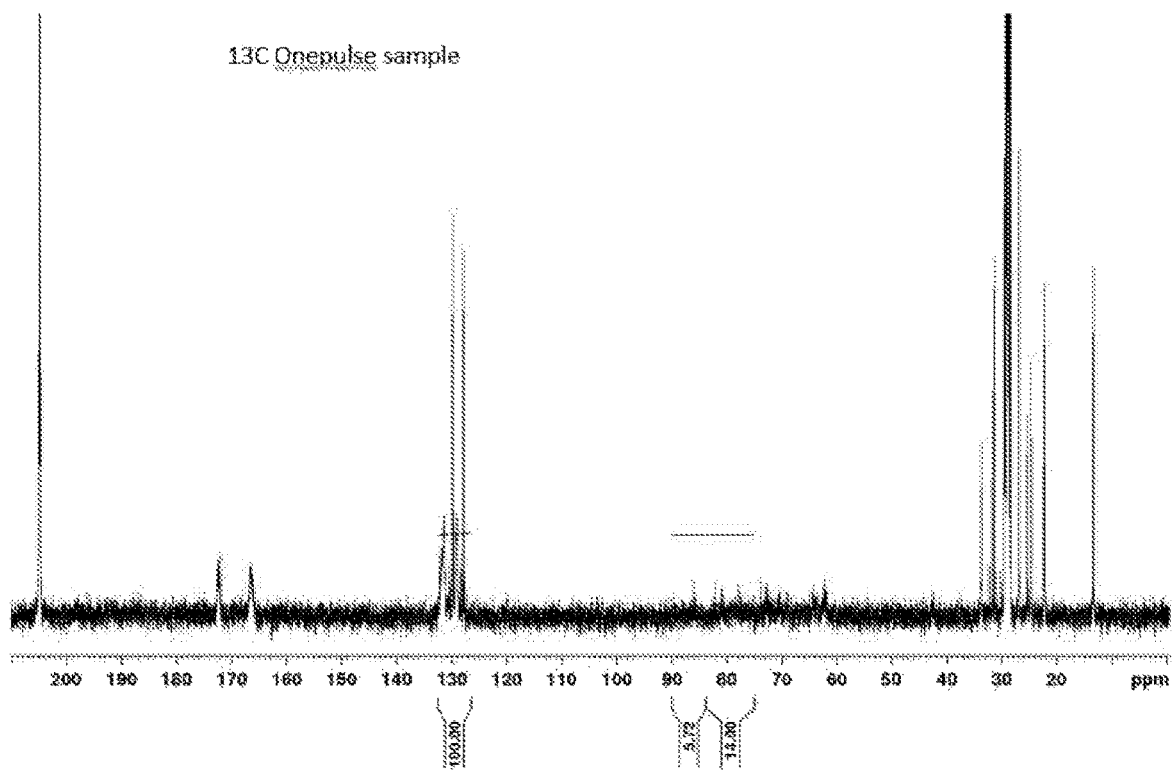
FIG. 8 shows the One Pulse $^{13}C$ NMR spectrum of an alkyd polymer prepared with sorbitol according to an embodiment of the invention.
Figure 9:
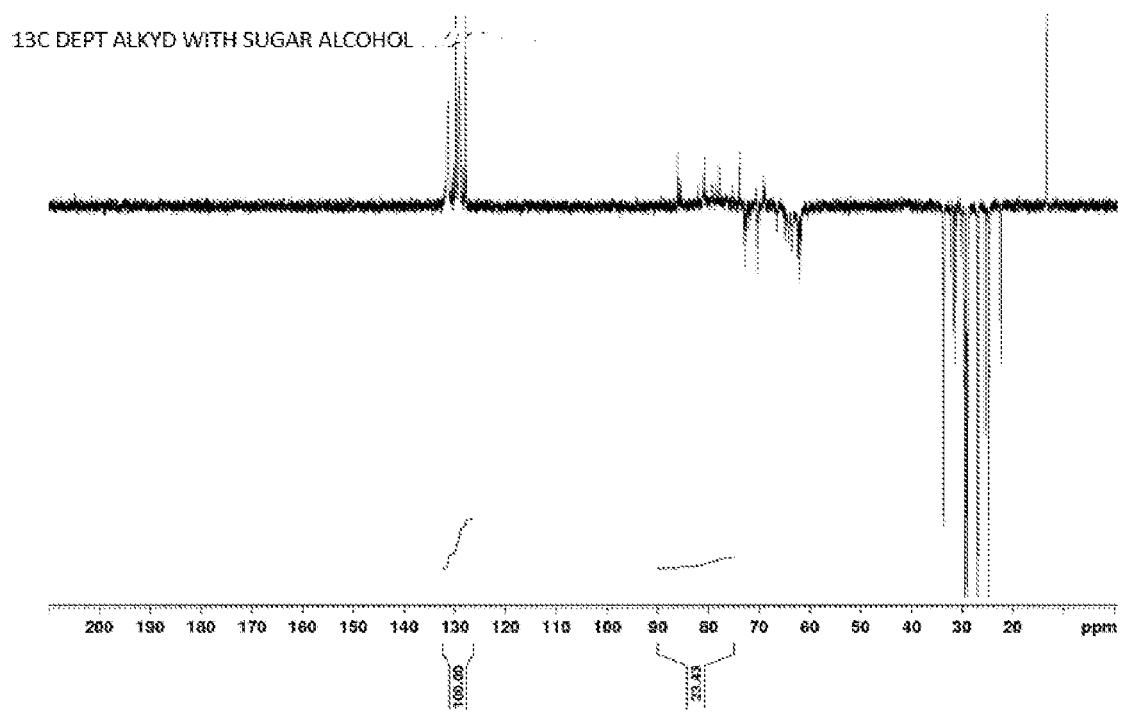
FIG. 9 shows the DEPT $^{13}C$ NMR spectrum of an alkyd polymer prepared with sorbitol according to an embodiment of the invention.

The NMR spectra of the control alkyd polymer prepared without sugar alcohol are shown in FIGS. 4 and 5. The spectra show no appreciable signals between 75 and 90 ppm, while those for the alkyd polymer material produced with sugar alcohol shown in FIGS. 8 and 9 clearly exhibit distinctive signals between 75 and 90 ppm which correspond to the cyclic ether structure.

Figure 6:
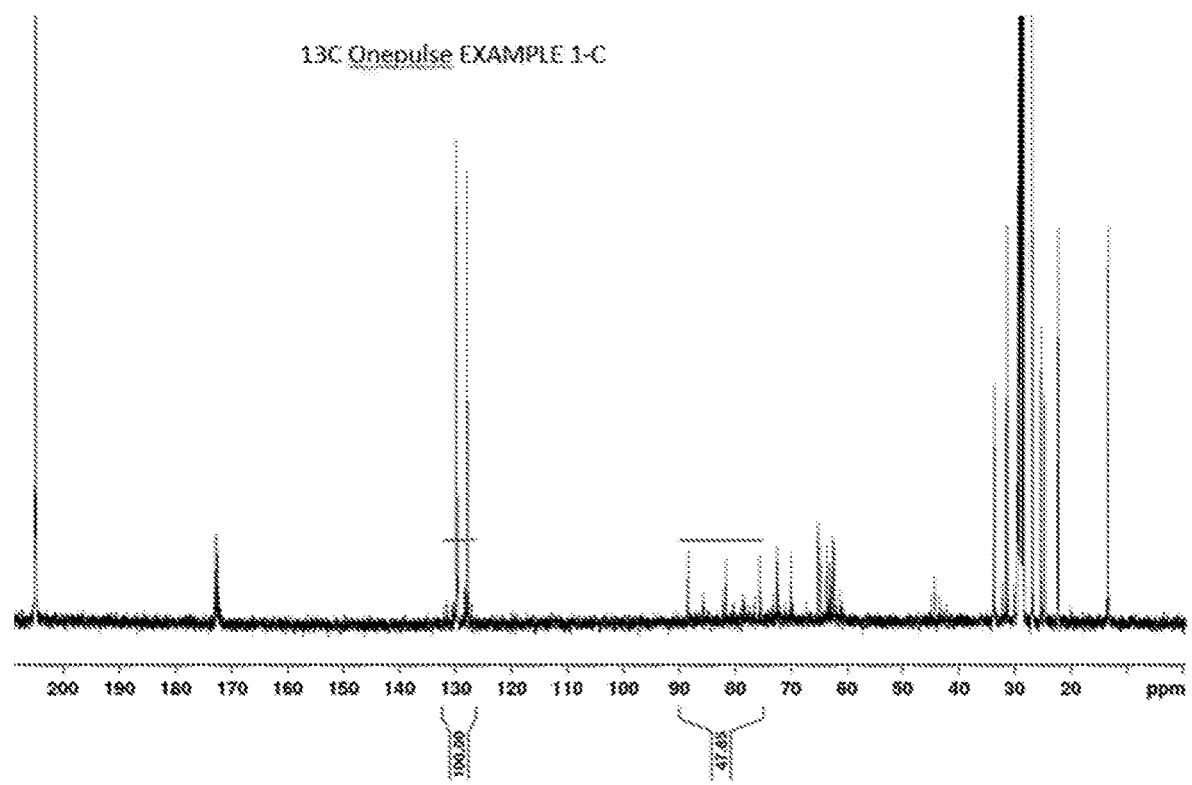
FIG. 6 shows the $^{13}C$ One Pulse NMR spectrum of a cyclic ether- and hydroxyl-containing composition prepared with sorbitol according to an embodiment of the invention.
Figure 7:
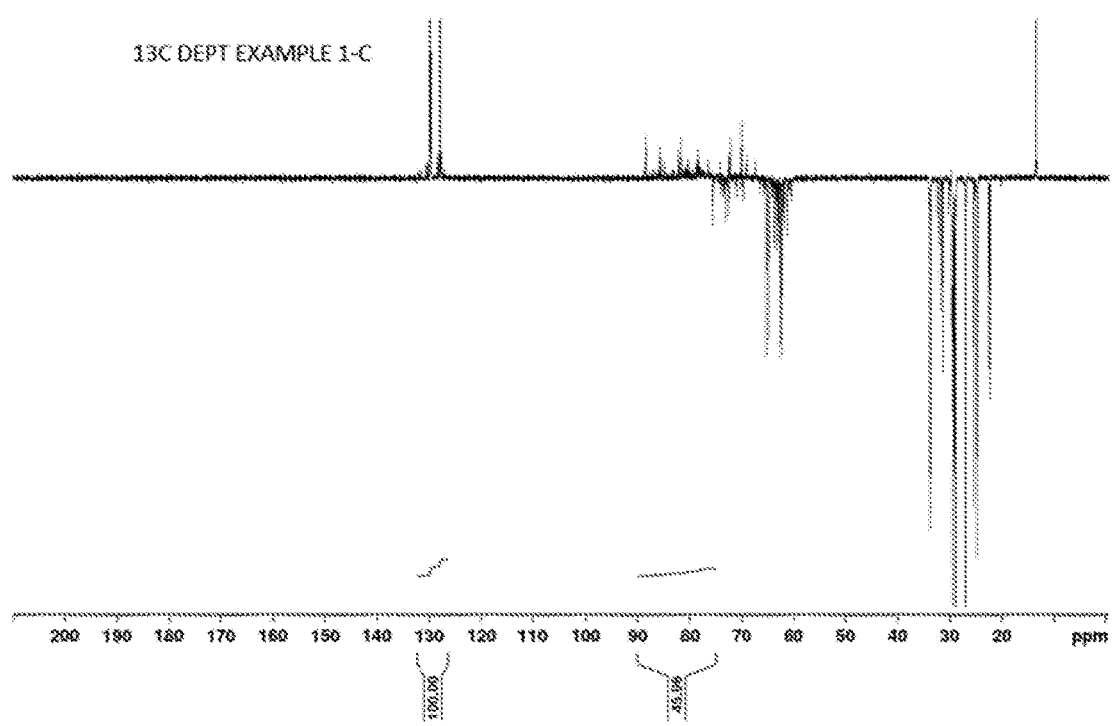
FIG. 7 shows the DEPT $^{13}C$ NMR spectrum of a cyclic ether- and hydroxyl-containing composition prepared with sorbitol according to an embodiment of the invention.

The NMR spectra shown in FIGS. 6 and 7 are for the material of inventive Example 1-C. Example 1-C is the cyclic ether- and hydroxyl-containing composition formed during alcoholysis prior to the formation of the alkyd polymer. Since this composition contains no aromatic moiety, the signals between 126 and 132 ppm in FIG. 6 and FIG. 7 are due only to the vinyl carbons in the unsaturated bonds of the oil.

The ratio of signal integration between 75 and 90 ppm to signal integration between 126 and 132 ppm therefore is related to the amount of cyclic ether ring relative to the oil.

This ratio determines the usefulness of the cyclic ether- and hydroxyl-containing composition to produce fast drying alkyd polymer after the condensation reaction with poly acid compound and/or anhydride compound.

For a useful cyclic ether- and hydroxyl-containing composition, the ratio of signal integration between 75 and 90 ppm to signal integration between 126 and 132 ppm should be higher than 0.25. This is shown in Table 7 below and in FIG. 6 and FIG. 7.

For the alkyd polymer produced in Example 3, also according to the invention, where the aromatic phthalic anhydride is included as a constituent in the alkyd polymer, the signals in the spectra from 126 to 132 ppm represent both the vinyl carbons from the unsaturated bonds of the oil and the aromatic carbons from phthalic anhydride. Therefore, the ratio of signal integration between 75 and 90 ppm to signal integration between 126 and 132 ppm is related to the amount of cyclic ether ring relative to the total amount of oil and aromatic compound.

For a useful cyclic ether alkyd polymer for a sufficiently fast drying coating, the ratio of signal integration between 75 and 90 ppm to signal integration between 126 and 132 ppm should be higher than 0.10. This is shown below in Table 7 and in FIGS. 8 and 9.

TABLE 8

Results of $^{13}$C NMR Studies

| Material | NMR Analysis Method | Ratio of: Signal integration between 75 and 90 ppm to Signal integration between 126 and 132 ppm | NMR Spectrum |
|---|---|---|---|
| Alkyd polymer produced without sugar alcohol (control) | $^{13}$C One pulse<br>$^{13}$C DEPT | 0<br>0.0047 | FIG. 4<br>FIG. 5 |
| Example 1-C: cyclic ether- and hydroxyl-containing composition with 0.00136 moles of cyclic ether per gram of the composition (according to the invention) | $^{13}$C One pulse<br>$^{13}$C DEPT | 0.4762<br>0.4545 | FIG. 6<br>FIG. 7 |
| Example 3: alkyd polymer with high level of cyclic ether- and hydroxyl-containing composition (according to the invention) | $^{13}$C One pulse<br>$^{13}$C DEPT | 0.1960<br>0.2325 | FIG. 8<br>FIG. 9 |

In some embodiments, the invention herein can be construed as excluding any element or process step that does not materially affect the basic and novel characteristics of the composition or process. Additionally, in some embodiments, the invention can be construed as excluding any element or process step not specified herein.

Although the invention is illustrated and described herein with reference to specific embodiments, the invention is not intended to be limited to the details shown. Rather, various modifications may be made in the details within the scope and range of equivalents of the claims and without departing from the invention.

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

What is claimed is:

1. A method to produce an alkyd polymer composition, wherein the method comprises the steps of:
   a) alcoholysis of an alcoholysis mixture, wherein the alcoholysis mixture comprises:
      i. between 20 and 90 weight percent based on the weight of the alcoholysis mixture of at least one fatty acid ester,
      ii. between 5 and 80 weight percent based on the weight of the alcoholysis mixture of at least one sugar alcohol having at least 6 carbon atoms, wherein the at least one sugar alcohol is capable of forming one or two cyclic ether rings through intramolecular cyclization,
      iii. no poly acid nor an anhydride compound;
         wherein the alcoholysis is performed at an alcoholysis temperature and wherein the alcoholysis produces, at the end of an alcoholysis time, a cyclic ether- and hydroxyl-containing composition which exhibits a plurality of peaks in the range of 75-90 ppm on a spectra obtained from C$^{13}$ Nuclear Magnetic Resonance (NMR) spectroscopy and wherein the alcoholysis produces at the end of the alcoholysis time at least 0.001 mole of cyclic ether derived from the sugar alcohol per gram of cyclic ether- and hydroxyl-containing composition as determined by grams of produced water, wherein the grams of produced water and the moles of cyclic ether derived from the sugar alcohol per gram of cyclic ether- and hydroxyl-containing composition are related by the formula:

$$\frac{\text{moles of cyclic ether derived from the sugar alcohol}}{\text{gram of cyclic ether and hydroxyl containing composition}} = \frac{\text{grams of produced water}/18.02}{\text{total grams of alcoholysis mixture} - \text{grams of produced water}}$$

b) condensation of the cyclic ether- and hydroxyl-containing composition produced by the alcoholysis step a) with between 5 and 200 weight percent, based on the weight of the cyclic ether- and hydroxyl-containing composition of at least one of a poly acid or an anhydride compound,
      wherein the condensation step b) takes place after the alcoholysis step a), wherein the condensation step b) takes place at a condensation temperature, and wherein the condensation step b) forms the alkyd polymer composition.

2. The method according to claim 1 wherein the at least one sugar alcohol is capable of producing at least two cyclic ether rings through intramolecular cyclization.

3. The method according to claim 1 wherein the alcoholysis mixture further comprises iv. at least one polyol comprising two or more hydroxyl functional groups per molecule, wherein the at least one polyol does not comprise a sugar alcohol.

4. The method according to claim 3 wherein the at least one polyol comprising two or more hydroxyl functional groups per molecule is present at 4 to 50 weight percent of the alcoholysis mixture.

5. The method according to claim 3 wherein the at least one polyol comprising two or more hydroxyl functional groups per molecule comprises a polyol selected from the group consisting of glyceraol, pentaerythritol, dipentaerythritol, neopentyl glycol, trimethylol propane, trimethylol ethane, hydrogenated bisphenol A, diethylene glycol, triethylene glycol, polyethylene oxide glycol, polypropylene oxide glycol, and mixtures thereof.

6. The method according to claim 5 wherein the at least one polyol comprises pentaerythritol.

7. The method according to claim 1 wherein the at least one sugar alcohol comprises at least one sugar alcohol selected from the group consisting of fucitol, galactitol, iditol, mannitol, sorbitol, and mixtures thereof.

8. The method according to claim 1 wherein the at least one sugar alcohol comprises sorbitol.

9. The method according to claim 1 wherein the alcoholysis mixture further comprises at least one catalyst.

10. The method according to claim 9 wherein the at least one catalyst comprises at least one catalyst selected from the group consisting of butyl tin oxide, dibutyl tin chloride, calcium oxide, lithium neodecanoate, calcium carbonate, lithium hydroxide, sodium hydroxide, calcium napthenate, and mixtures thereof.

11. The method according to claim 9 wherein the at least one catalyst comprises lithium neodecanoate.

12. The method according to claim 1 wherein the at least one fatty acid ester comprises dehydrated castor oil, castor oil, soybean oil, tall oil, sunflower oil, coconut oil, linseed oil, tung oil, safflower oil, or mixtures thereof.

13. The method according to claim 1 wherein the at least one fatty acid ester comprises soybean oil.

14. The method according to claim 1 wherein the at least one of poly acid or anhydride compound comprises a compound selected from the group consisting of phthalic anhydride, adipic acid, maleic anhydride, succinic anhydride, hexahydrophthalic anhydride, tetrahydrophthalic anhydride, succinic acid, sebacic acid, terephthalic acid, isophthalic acid, trimelletic anhydride, trimelletic acid, 5-(sodiosulfo)-isophthalic acid, pyromellitic dianhydride and mixtures thereof.

15. The method according to claim 14 wherein the at least one of an anhydride compound comprises phthalic anhydride.

* * * * *